(12) United States Patent
Feehrer et al.

(10) Patent No.: US 9,280,290 B2
(45) Date of Patent: Mar. 8, 2016

(54) METHOD FOR STEERING DMA WRITE REQUESTS TO CACHE MEMORY

(71) Applicant: Oracle International Corporation, Redwood City, CA (US)

(72) Inventors: John R Feehrer, Westford, MA (US); Hugh R Kurth, Bedford, MA (US); Aron J Silverton, Chicago, IL (US); Patrick Stabile, Everett, MA (US)

(73) Assignee: Oracle International Corporation, Redwood Shores, CA (US)

( * ) Notice: Subject to any disclaimer, the term of this patent is extended or adjusted under 35 U.S.C. 154(b) by 222 days.

(21) Appl. No.: 14/178,626

(22) Filed: Feb. 12, 2014

(65) Prior Publication Data

US 2015/0227312 A1    Aug. 13, 2015

(51) Int. Cl.
*G06F 13/28* (2006.01)
*G06F 13/36* (2006.01)
*G06F 3/06* (2006.01)

(52) U.S. Cl.
CPC .............. *G06F 3/061* (2013.01); *G06F 3/0635* (2013.01); *G06F 3/0673* (2013.01)

(58) Field of Classification Search
None
See application file for complete search history.

(56) References Cited

U.S. PATENT DOCUMENTS

| 5,953,538 | A | 9/1999 | Duncan et al. |
| 7,231,470 | B2 * | 6/2007 | Huggahalli ......... G06F 12/0806 710/1 |
| 7,769,950 | B2 | 8/2010 | Sih et al. |
| 7,937,534 | B2 | 5/2011 | Madukkarumukumana et al. |
| 8,327,039 | B2 | 12/2012 | Chou et al. |
| 2006/0090016 | A1 | 4/2006 | Edirisooriya |

* cited by examiner

*Primary Examiner* — Idriss N Alrobaye
*Assistant Examiner* — Richard B Franklin
(74) *Attorney, Agent, or Firm* — Meyertons Hood Kivlin Kowert & Goetzel

(57) ABSTRACT

A system may include a processor which may include a cache memory and a Direct Memory Access (DMA) controller, a peripheral device on an I/O expansion bus, and a bus interface coupled to the I/O expansion bus and the processor. The bus controller may determine if data packets sent from the peripheral device to the processor include a DMA write instruction to the cache memory with an optional desired cache location. Upon determining a DMA write instruction to the cache memory is included in the data packet, the bus controller may format the data in the data packet for storage in the cache and either receive the desired cache location or determine an appropriate location within the cache to store the formatted data. The bus controller may determine an alternate location within the cache if the desired location within the cache cannot accept more data from the peripheral device.

20 Claims, 6 Drawing Sheets

METHOD FOR STEERING DMA WRITE REQUESTS TO CACHE MEMORY

BACKGROUND

1. Field of the Invention

This invention relates to processors and, more particularly, to implementation of I/O expansion buses in computing systems.

2. Description of the Related Art

A particular feature of some computing systems is the ability to expand the system to add new features or to upgrade existing capabilities. Some computing systems may include an I/O expansion bus to allow for adding hardware into a computing system. Many of these systems will use an industry standard bus format such that standardized hardware may be used for expansion. Some examples of industry standard bus formats are Peripheral Component Interconnect (PCI®), Peripheral Component Interconnect Express (PCI Express® or PCIe®), Universal Serial Bus (USB), and Serial Advanced Technology Attachment (SATA).

Many peripherals may need to exchange data with a system memory or one or more processors. A Direct Memory Access (DMA) controller may be used to facilitate such data exchanges. A DMA controller may read data from a source and write the data to a destination without involvement from another processor in the systems, allowing the processors to engage in other tasks or idle in low power modes.

To improve execution performance, processors may include one or more levels of cache memories (commonly referred to as "caches"). A cache may be used to store frequently accessed instructions and/or memory data, and improve performance by reducing the time for the processor to retrieve these instructions and data. A processor may include a fast first-level (L1) cache backed by a larger, slower second-level (L2) cache. Some processors may include a third-level (L3) cache for further performance improvement. A processor may read data resident in a cache faster than it can read data from a system memory, such as system Random Access Memory (RAM), flash or a hard-disk drive (HDD).

In some computer systems, a given processor may be receiving and processing data from a given peripheral. A known process for doing this may be configuring the DMA controller to receive data from the given peripheral and write the data to the system RAM. The given processor may read the data from the system RAM and an associated cache may store the data locally for the processor to process. This process may not provide the most efficient method for providing data to a processor.

SUMMARY

Various embodiments of systems and methods for transferring data from a peripheral device to a processor are contemplated. In one embodiment, a computing system may include one or more processor cores, a first memory, a plurality of cache memories, each divided in a plurality of cache banks, at least one Direct Memory Access (DMA) controller, at least one peripheral device, and a bus interface. The bus interface may be configured to receive a transaction packet from a given peripheral device and determine if the transaction packet indicates a DMA write instruction. If a DMA write instruction is indicated, the bus interface may select a cache bank in one of the plurality of cache memories as a destination for the DMA write instruction. After selecting a cache bank, the bus interface may send contents of the transaction packet to a DMA controller along with instructions to store the contents in the selected cache bank in the selected cache memory.

In another embodiment, to select a cache bank in one of the plurality of cache memories, the bus interface may determine if the transaction packet includes a preferred cache memory and bank. If a preferred cache memory is included, but not a preferred cache bank, then the bus interface may determine a target cache bank in the preferred cache memory.

In still another embodiment, the bus interface may be configured to limit an amount of cache memory a given peripheral device may use. The bus interface may add credits to a total number of credits available to the given device when cache memory is released. The bus interface may also deduct credits from the total number of available credits for the given device as cache memory is used by the device.

In a further embodiment, to select a cache bank within the cache memories, the bus interface may determine if the transaction packet contains control values, frequently accessed, or time sensitive data. If the transaction packet does not include control values, frequently accessed, or time sensitive data, the bus interface may select an address in the first memory as the destination of the DMA write instruction.

These and other embodiments will become apparent upon reference to the following description and accompanying drawings.

BRIEF DESCRIPTION OF THE DRAWINGS

The following detailed description makes reference to the accompanying drawings, which are now briefly described.

Figure 1:
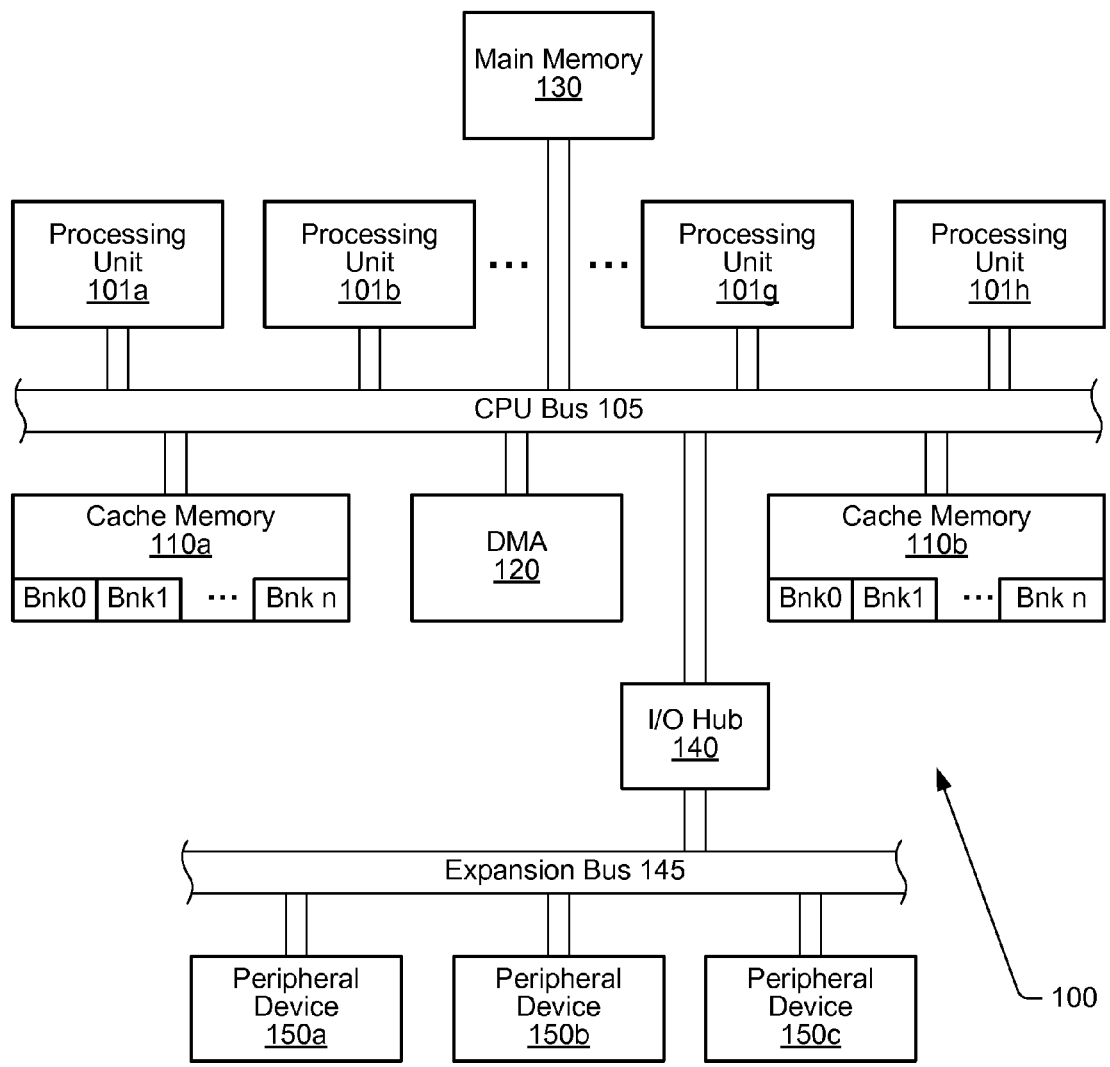
FIG. 1 is a block diagram illustrating an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/ circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Introduction

Generally speaking, a processor core (also referred to herein as a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, the number of cores in the processor, and speed of the memory accesses.

In some embodiments, a mechanism that may be utilized for improving the speed of the memory accesses, and therefore the performance of a processing core, is to employ a cache memory between the processor and the memory or memories from which data and program instructions are read. Caches may improve performance of a processor by storing data and/or instructions from frequently accessed memory locations in a local memory that may have faster access times than other memories.

Peripherals in a computer system may be configured to interface to a specific core in a multi-core system. In some embodiments, the peripheral may always interface with a given core due to the capabilities of the given core or due to other hardware that is coupled to the given core or for other reasons. In other embodiments, a given core may be dynamically assigned to the peripheral due to the given core being idle at the time the assignment is made or due to a particular advantage the given core may have at the time or for other reasons. For example, a peripheral such as an Ethernet network interface card may be temporarily assigned to a given core while a file to be used by that core is being downloaded. In another example, a peripheral such as an audio sound card may be configured to always interface with a particular core that may have audio processing capabilities that may be absent from other cores in the system. In some embodiments, the data may be ordinary data that does not benefit system performance when accessed more quickly by the given processor. In other embodiments, the data may be instructions or time sensitive data that does require or does benefit from faster access by the given processor. In the latter case, a method for making data from a peripheral available to a processor in a more timely manner is desired.

Various embodiments of a computing system and methods to manage data transactions through the computing system are discussed in this disclosure. The embodiments illustrated in the drawings and described below may provide techniques for identifying sensitive data and storing the sensitive data in a preferred cache location within the computing system allowing for faster access to the sensitive data by a given processor.

Overview of Computer Systems

FIG. 1 illustrates an embodiment of a computer system 100. Computer system 100 may comprise a plurality of functional blocks including a plurality of processing units 101a-101h, one or more cache memories 110a-110b, a DMA 120, a main memory 130, and an Input/Output (I/O) hub 140. These functional blocks may be coupled through CPU bus 105. I/O hub 140 may couple an I/O expansion bus 145 to CPU bus 105. I/O expansion bus 145 may couple a plurality of peripheral devices 150a-150c to I/O hub 140.

Processing units 101 may, in various embodiments, be representative of a general-purpose processor that performs computational operations. For example, processor 101 may be a central processing unit (CPU) such as a microprocessor, a graphics processing unit (GPU), an application-specific integrated circuit (ASIC), or a field-programmable gate array (FPGA). Processing units 101 may include one or more of the commercially available processing units, e.g., the Intel x86 family of processors, the Sun SPARC™ family of processors, the PowerPC™ family of processors, etc.

In some embodiments, processing units 101 may include multiple versions of the same processor, i.e., a homogenous multi-core system. In other embodiments, processing units 101 may include a mix of two or more processors, i.e., a heterogeneous multi-core system.

CPU bus 105 may couple multiple functional blocks together, thereby allowing communication between the coupled blocks. CPU bus 105 may support one of any suitable protocols and may be any number of bits wide, such as, e.g., 32 bits, 64 bits or 128 bits wide. CPU bus 105 may, in various embodiments, support an industry standard bus protocol associated with processing units 101 while, in other embodiments, CPU bus 105 may support a proprietary bus protocol.

Cache memories 110 may store instructions and data for one or more processing units 101. Processing units 101 may look for data in cache 110 before reading the data from main memory. A cache hit may occur when a processing unit 101 finds the data it requested resident in the cache 110. Cache memories 110 may include multiple levels, where lower level caches may be smaller and have lower hit rates, but provide faster memory accesses. Higher-level caches may have higher hit rates, but also have more latency when responding to a data request.

Cache memories 110 may be implemented from Static RAM (SRAM) or Dynamic RAM (DRAM), or any other suitable storage circuit. In some embodiments, each cache memory 110a-110b may reside on a same die as one or more processing units 101a-101h. In other embodiments, each of cache memories 110a-110b may be implemented on a separate die in the same package as one or more processors 101 or in a separate package on the same circuit board. Each cache memory 110a-110b may be organized into a plurality of banks, denoted as Bnk0-Bnkn in FIG. 1. One or more banks may be assigned to a given processor 101. In some embodiments the assignment may be temporary and in other embodiments, the assignment may be fixed.

DMA controller 120 may be capable of transferring data from any addressable source address to any writable address in computer system 100. An addressable source address may be any memory or register location with an address on CPU bus 105. In some embodiments, DMA controller 120 may be limited to a subset of addressable addresses. Computer system 100 may include multiple versions DMA controller 120, one in each processor die, or computer system 100 may have a single DMA controller 120. DMA controller 120 may be capable of writing to and reading from caches 110. In some embodiments, DMA controller 120 may be limited to accessing a subset of caches in computer system 100.

Main memory 130 may store instructions and data for some or all of processing units 101. Main memory 130 may include both volatile and non-volatile memory, such as Dynamic RAM (DRAM), Static RAM (SRAM), flash, and a hard-disk drive (HDD), for example. In other embodiments, main memory 130 may include only volatile memory and non-volatile memory may be coupled through another interface such as I/O hub 140. In various embodiments, main memory 130 may be a memory controller coupled to one or more memory devices.

I/O hub 140 may act as a bus bridge between CPU bus 105 and I/O expansion bus 145. I/O hub 140 may, in various embodiments, translate bus protocols. For example, a CPU bus 105 memory access that uses the CPU bus protocol may be translated into a command for a given one of peripheral devices 150 that uses a protocol for expansion bus 145. In some embodiments, I/O hub 140 may reverse the process and translate data from a given one of peripheral devices 150 into a memory access that uses the CPU bus protocol.

I/O hub 140 may also maintain a mapping of peripheral devices 150 to memory address on CPU bus 105. In some embodiments, peripheral devices 150 may each have an address on I/O expansion bus 145. The expansion bus address may be mapped to a different address on CPU bus 105. I/O hub 140 may maintain a table of these CPU bus address to expansion bus address mappings. In other embodiments, the expansion bus address may be equal to the CPU bus address and no mapping may be necessary.

Expansion bus 145 may allow for expansion of computer system 100 by enabling a standardized physical interface into which compatible computer hardware may be coupled. Expansion bus 145 may support any of the previously mentioned industry standard bus formats such as, for example, Peripheral Component Interconnect (PCI), Peripheral Component Interconnect Express (PCI Express or PCIe), Universal Serial Bus (USB), Serial Advanced Technology Attachment (SATA) or any other suitable proprietary bus format.

Peripheral devices 150 may be any type of computer hardware supporting a bus format and physical interface compatible with I/O expansion bus 145. One feature of I/O expansion bus 145 is the ability to add and subtract hardware from computer system 100 without impacting the basic functionality of the system. Therefore, at any given time, computer system 100 may have zero or more peripheral devices coupled to I/O expansion bus 145. Peripheral devices 150 may have a varied range in functionality. Examples of possible peripheral devices are Ethernet network interface cards, Wi-Fi wireless network interface cards, graphics processors, audio processors, HDDs, flash-based solid state drives (SDDs), etc.

It is noted that the embodiment illustrated in FIG. 1 is merely an example. In other embodiments, different functional blocks and different configurations of functional blocks may be employed.

Figure 2:
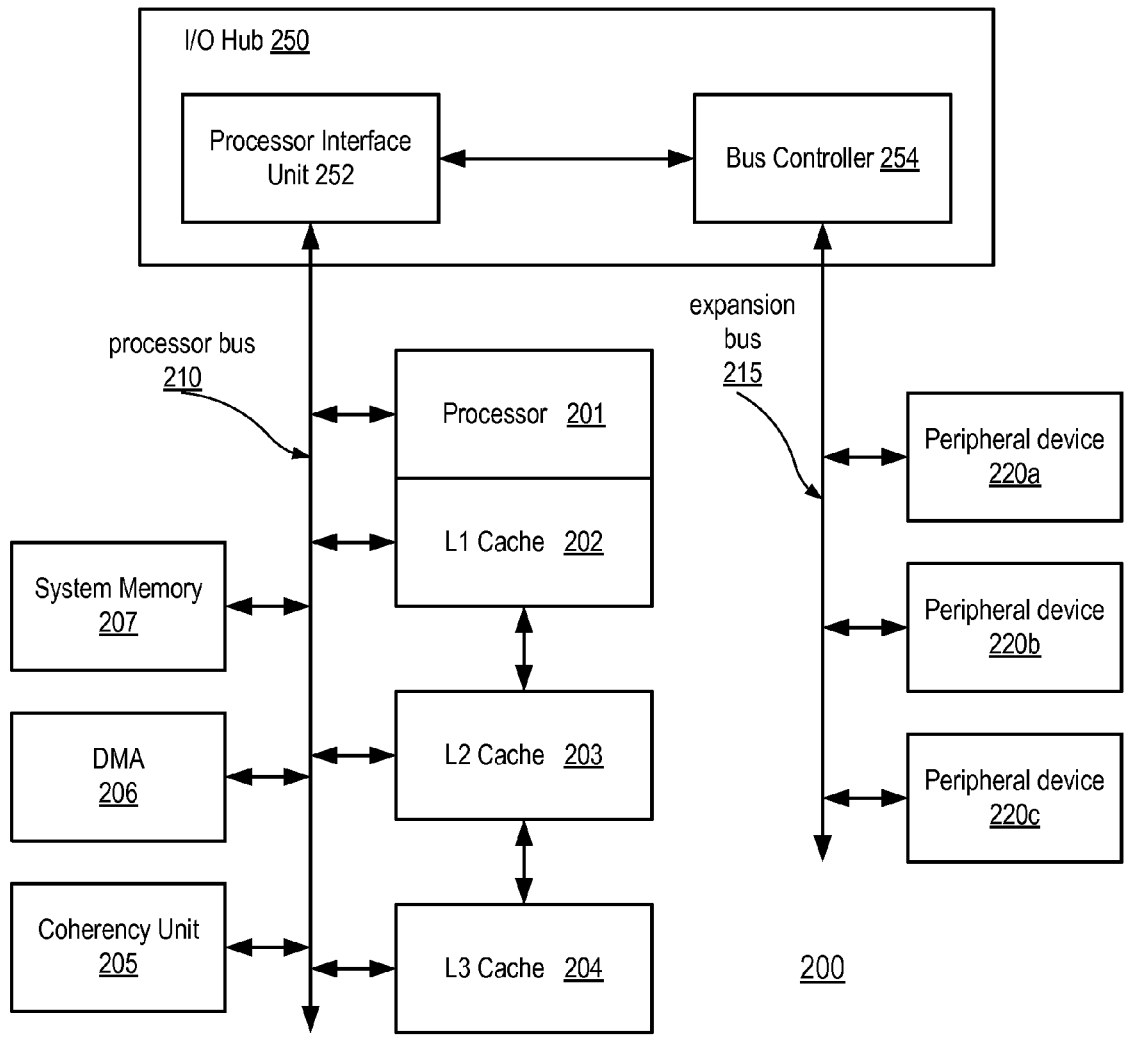
FIG. 2 is a block diagram illustrating another embodiment of a computing system.

Turning to FIG. 2, another embodiment of a computer system 200 is illustrated. Computer system 200 may include processor 201, L1 cache 202, L2 cache 203, L3 cache 204, coherency unit 205, DMA controller 206, a system memory 207, and an I/O hub 250. These functional blocks may be coupled through processor bus 210. I/O hub 250 may couple an expansion bus 215 to processor bus 210. I/O hub 250 may include processor interface 252 and bus controller 254. Expansion bus 215 may couple a number of peripheral devices 220a-220c to bus controller 254.

Processor 201 may be of similar functionality to processing units 101 in FIG. 1. Processor 201 may include a single core or may include multiple cores. In some embodiments, processor 201 may also support multithreaded operations, i.e., synchronous execution of multiple threads of one or more software programs. In various embodiments, computer system 200 may include more than one processor 201.

It is noted that a software program may include a sequence of instructions such that when executed by a computer system, cause the computer system to perform one or more functions. A software thread may refer to the execution of an individual software program. In some embodiments, multithreading may refer to parallel execution of two or more software programs on the same computer system (i.e. the same physical processor or set of processors). For example, a word processing program may represent one thread and an email program may represent another thread and both may run at the same time on a single computer system. Multithreading may also refer to parallel processing of different functions of a single software program. For example, one thread may be a function of an email program that polls a server for new incoming messages while a second thread may be a new outgoing email message being written by a user.

L1 cache 202 may be the first memory location accessed when processor 201 requests data or instructions. In some embodiments, L1 cache may have a lower latency (i.e., time delay for responding to a cache access) than L2 cache 203 or L3 cache 204. L1 cache 202 may also have a lower cache hit rate than L2 cache 203 or L3 cache 204, due for example to the L1 cache being smaller than the L2 cache and the L2 cache being smaller than the L3 cache. In some embodiments, L1 cache 202 may be organized into banks such that one or more banks are assigned to each of a plurality of program threads.

L2 cache 203 may be the second memory location accessed when processor 201 requests data or instructions. In some embodiments, L2 cache 203 may have a lower latency than L3 cache 204. In some multithreading embodiments, L2 cache 203 may be organized into banks similar to L1 cache 202.

L3 cache may be the third memory location accessed when processor 201 requests data or instructions. In some embodiments, L3 cache 204 may have the highest latency of the three caches illustrated in FIG. 2. L3 cache 204 may also have the highest cache hit rate of the three illustrated caches. In some multithreading embodiments, L3 cache 204 may be organized into banks such as described for L1 cache 202.

Each of L1 cache 202, L2 cache 203 and L3 cache 204 may be on the same die as processor 201. In other embodiments, one or more of these caches may be on a different die in the same package or in a different package from processor 201. In embodiments in which computer system 200 may include more than one processor 201, computer system 200 may also include more than one L1 cache 202, L2 cache 203 or L3 cache 204.

Coherency unit 205 may monitor all memory requests generated within processor 201 and by any other functional block coupled to processor bus 210. Multiple coherency units may be included in computer system 200 when multiple processors 201 are included.

Coherency unit 205 may update the status of cache entries, such as, for example if a memory location is modified outside of a given cache when the given cache holds a copy of the memory location. In some embodiments, coherency unit 205 may also track an order and a priority for memory requests generated from processor 201. Coherency unit may control the flow of memory accesses to maintain the correct program order in which the accesses were made, while allowing higher priority memory accesses to be executed ahead of lower priority accesses if the program allows.

DMA controller 206 may, in some embodiments, have similar functionality to DMA 120. Computer system 200 may include multiple versions DMA controller 206 or computer system 200 may have a single DMA controller 206. DMA controller 206 may be capable of writing to and reading from each of L1 cache 202, L2 cache 203 and L3 cache 204. In some embodiments, DMA controller 206 may be limited to accessing a subset of the three illustrated caches in computer system 200.

In some embodiments, system memory 207 may function similarly to main memory 130 as illustrated in FIG. 1. System memory 207 may, in various embodiments, be a memory controller coupled to one or more memory devices.

Processor bus 210 and I/O expansion bus 215 may have similar functionality and features to CPU bus 105 and I/O expansion bus 145 in FIG. 1, respectively. Peripheral devices 220 may be any number of computer hardware modules with an interface compatible with expansion bus 215.

I/O hub 250 may have similar functionality to I/O hub 140 in FIG. 1. I/O hub 250 may include two sub-blocks, processor interface unit 252 and bus controller 254. Processor interface unit 252 may translate a processor bus 210 memory access that uses the processor bus protocol into a command for a given one of peripheral devices 220 and send this command to bus controller 254. Processor interface unit 252 may reverse the process to translate a command from bus controller 254 originating from a given one of peripheral devices 220 into a memory access that uses the processor bus protocol.

Bus controller 254 may maintain a mapping of peripheral devices 220 to memory address on processor bus 210. Bus controller 254 may also read header information that may be included in transaction packets received from peripheral devices 220. In various embodiments, the header information may include additional instructions on the target destination of data contained in the received packet or may include information on the type of data contained in the received packet. Bus controller 254 may use information from a packet header to modify instructions to processor interface unit 252 regarding the disposition of data contained in the packet. For example, in a given embodiment, a transaction packet from peripheral device 220a may be received by bus controller 254. A header in the received transaction packet may indicate a preferred bank in a preferred cache for storing the data contained in the packet. Bus controller 254 may read this information in the packet header and use the indicated preferred bank as the target destination for at least some of the data contained in the packet and send an instruction to processor interface unit 252 to store selected data in the preferred bank of the preferred cache. Transaction packets and their header contents will be described in more detail below.

In some instances, peripheral device 220a may indicate a preferred bank in a preferred cache at a time when the preferred bank may be full and unable to accept more entries. In some embodiments in such cases, processor interface unit 252 may determine if an alternative bank in the preferred cache is able to accept the data from the transaction packet. In a further example, if the preferred cache is busy with a separate cache request, processor interface unit 252 may determine if an alternate cache is available to receive data and has enough entries to store the data from the packet.

It is noted that the computer systems illustrated FIG. 2 is merely an example. In other embodiments, different functional blocks, a different number of functional blocks, and different configurations of functions blocks may be possible dependent upon the specific application for which the computer systems are intended.

Data Flow Through Computer System

Figure 3:
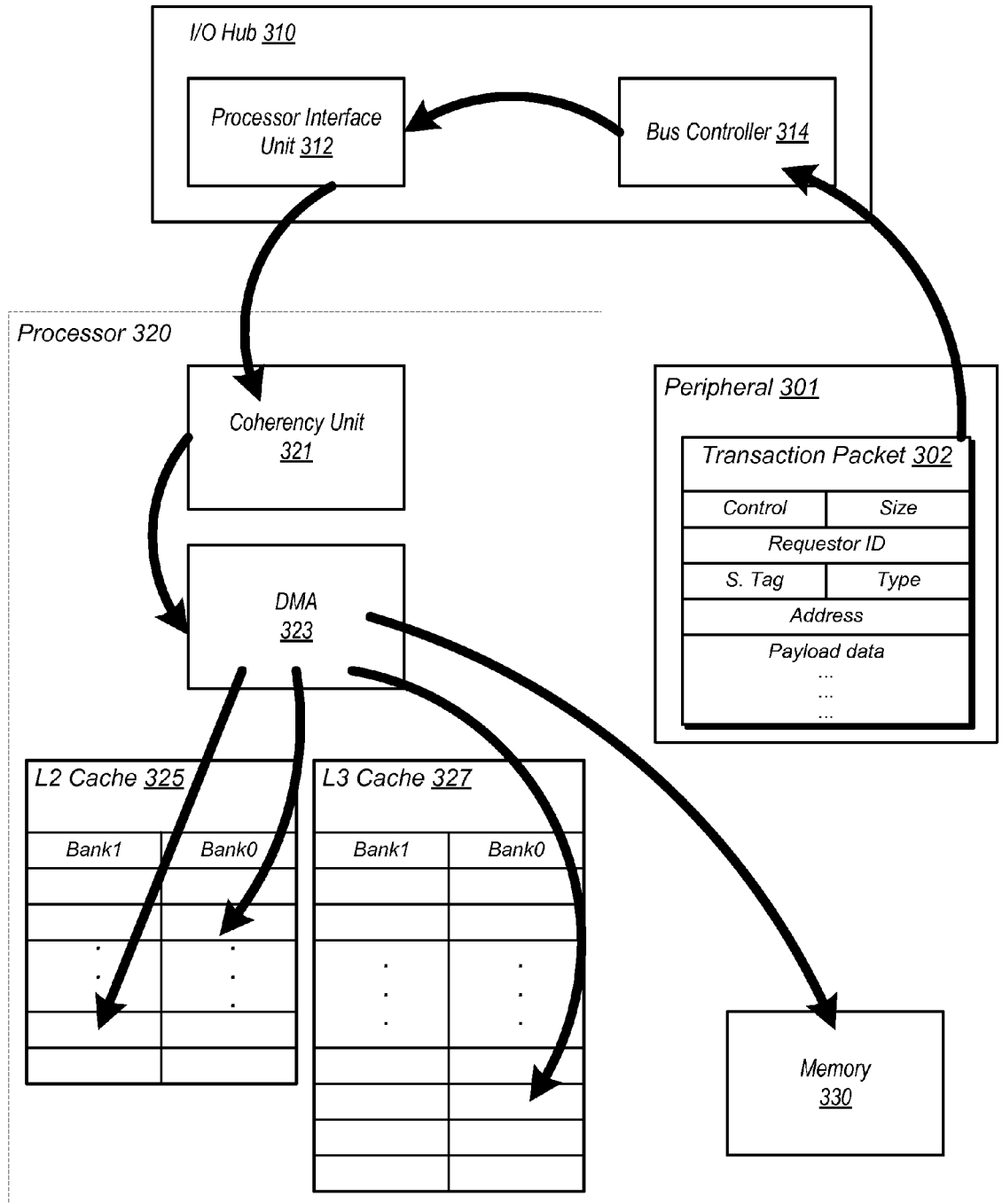
FIG. 3 illustrates a diagram of the data flow of a transaction packet in a computing system.

Moving to FIG. 3, a diagram depicting the flow of data from a peripheral to a memory location within an embodiment of a computer system is illustrated. The computer system may, in some embodiments, correspond to computer system 100 or computer system 200. The arrows shown in FIG. 3 are intended to merely indicate the flow of data from a peripheral to a processor. Referring collectively to FIG. 2 and FIG. 3, the flow of data may start in peripheral 301.

Peripheral 301 may correspond to one of peripheral devices 150 in FIG. 1 or one of peripheral devices 220 in FIG. 2. Peripheral 301 may have a block of data to send to processor 320. The block of data may be formatted into transaction packet 302 and conform to a bus standard such as PCIe bus or USB. Various embodiments of a transaction packet 302 may include a header which may include values such as a requestor ID, data type descriptor, size, address, a payload block, control information, and a steering tag.

The requestor ID may be a value to indicate which functional block in computer system 200 generated transaction packet 302. In this example, the requestor ID may correspond to peripheral 301. The data type descriptor may describe what type of data is included in the packet. For example, the data may be raw data from a file being processed or the data may include control instructions for the requesting functional block. In some embodiments, size may refer to the size of the entire transaction packet 302. In other embodiments, size may refer only to the size of the payload and in further embodiments the size may be two values, one for the size of the header and one for the size of the payload. The size value may indicate a number of bits, bytes, 16-bit words or 32-bit double words. In other embodiments the size value may correspond to one of a number of predefined sizes. The address value may correspond to an address on processor bus 210 for a read request or write request, or may be an address in peripheral 301's own virtual address space that needs to be translated to an address valid on the processor bus 210. The payload block may be raw data being sent in a write request or may be a command or configuration information for a given processor. The payload may be null in a read request or the payload may contain additional details regarding the data to be read. Control information may include a variety of values to indicate the type of transaction packet, such as, for example, a read request or a write request and may include one or more values to indicate what type of information is included in the header, such as, for example, if a valid steering tag is included.

Some embodiments of transaction packet 302 may include a steering tag which may include values to provide additional details regarding where a write request payload should be stored. The steering tag may provide more details about the storage location than can be retrieved from the address value. For example, peripheral 301 and processor 320 may have previously exchanged data and as part of the data exchange, processor 320 may indicate that data coming from peripheral 301 to processor 320 should be deposited in bank 1 of L2 cache 325, if that bank has available storage. In another embodiment, peripheral 301 may be configured in an initialization process to always indicate a preference for bank 1 of L2 cache 325 when sending data to processor 320. Bank 1 of L2 cache 325 may not have a direct address on processor bus 210 that could be used as the address field in the transaction packet header. However, a steering tag may be used by bus controller 314 to determine that bank 1 of L2 cache 325 is the preferred target destination rather than or in addition to the address indicated in the address field of transaction packet 302.

Peripheral 301 may send transaction packet 302 to bus controller 314 via expansion bus 215. Transaction packet may contain a write request with a steering tag indicating a preference for the data to be stored in bank 1 of L2 cache 325. Bus controller 314 may receive transaction packet 302 and process the header to determine the type of packet and the destination for the payload. In response to determining transaction packet 302 indicates a preference for bank 1 of L2 cache 325, bus controller 314 may format the payload for storage into cache lines and may send a communication to L2 cache 325 to determine if L2 cache 325 is available for a data exchange and has enough unused cache line entries in bank 1 to store the payload.

If L2 cache 325 is available and has sufficient unused entries in bank 1 to store the payload, then bus controller 314 may generate a DMA request to move the formatted payload into L2 cache 325. The DMA request may be sent to processor interface 312 which may send the DMA request to DMA controller 323. In some embodiments, coherency unit 321 may read the DMA request to know what data is being cached and may adjust the timing of the execution of the DMA request to maintain an order to memory and cache accesses. DMA controller 323 may store the formatted payload into bank 1 of L2 cache 325. In response, L2 cache 325 may update cache tags associated with the cache lines containing the formatted payload.

It is noted that FIG. 3 is merely an example of data flow from a peripheral to a processor. Various embodiments may include different paths, different numbers of caches, and/or different sets of interfaces. Transaction packet headers may include more or different values than illustrated. The physical arrangement of a computer system may not be represented by FIG. 3 as many other physical arrangements may be possible.

Methods for Transmitting Transaction Packets Via an Expansion Bus

Figure 4:
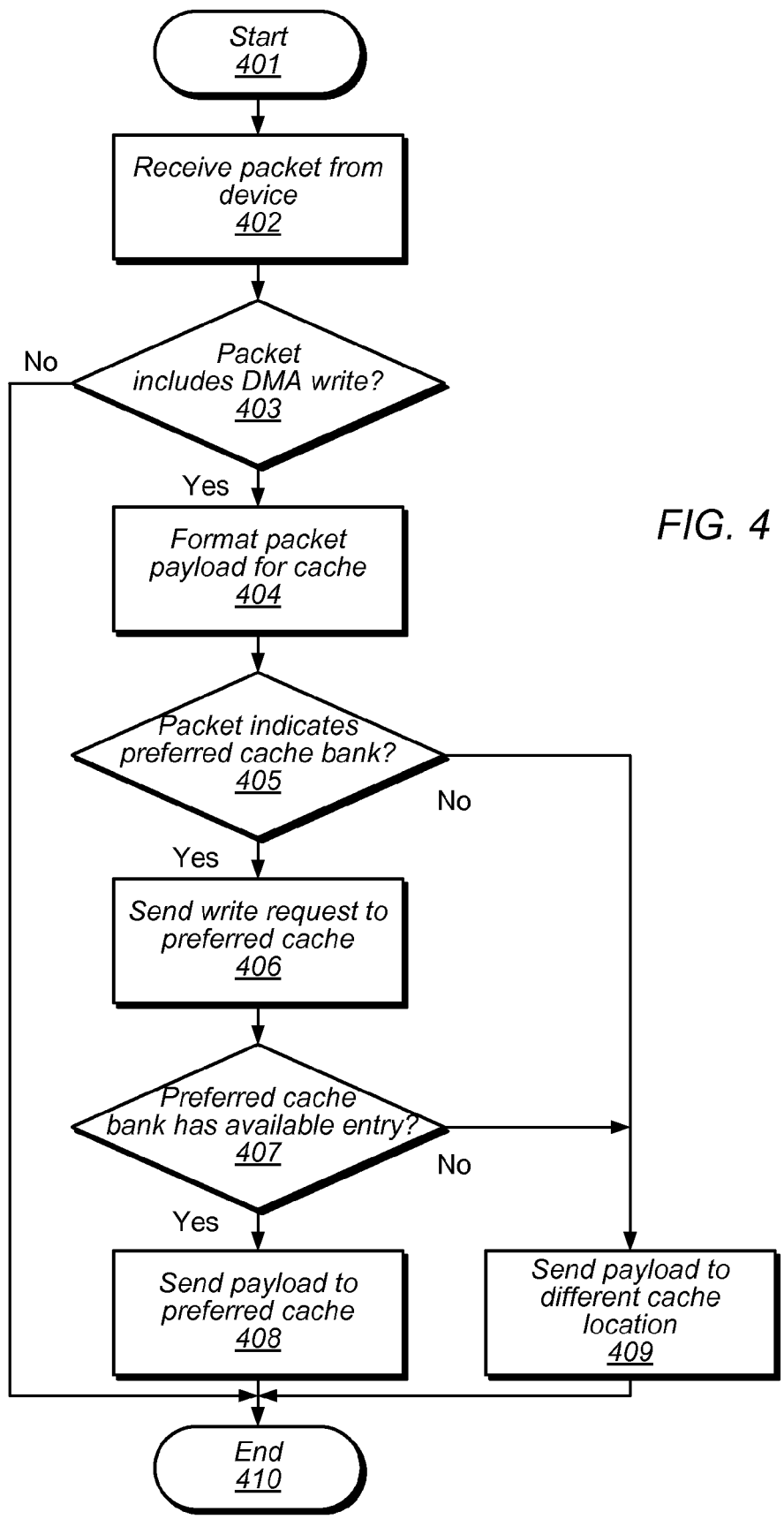
FIG. 4 illustrates a flow chart depicting an embodiment of a method for directing transaction packets.

Turning to FIG. 4, a method is illustrated for transmitting a transaction packet from an expansion bus to a cache memory, such as L2 cache 325 of FIG. 3. Referring collectively to the computing system and data flow illustrated in FIG. 3, and the flowchart depicted in FIG. 4, the method may begin in block 401. Peripheral 301 may have transaction packet 302 containing a data payload to be stored in bank 0 of L2 cache 325.

Bus controller 314 may then receive transaction packet 302 from peripheral 301 (block 402). Transaction packet 302 may be received via an expansion bus such as, e.g., expansion bus 145 in FIG. 1. In some embodiments, expansion bus 145 may confirm to a standardized bus format such as PCI or PCIe. In such cases, transaction packet 302 may include a header that conforms to the standardized bus format of expansion bus 145.

The method may then depend on whether transaction packet 302 includes a DMA write request (block 403). In some embodiments, the header may contain information related to the payload of transaction packet 302, including a value that may indicate the inclusion of a DMA write request. In further embodiments, the header may also include a value to indicate if the destination of the DMA write includes a cache memory. Bus controller 314 may read values from the header to determine if transaction packet 302 includes a DMA write request and if so, if the destination is a cache memory. If transaction packet 302 does not include a DMA write request, then the method may end in block 410.

If transaction packet 302 includes a DMA write request, bus controller 314 may then format the payload of transaction packet 302 (block 404). The payload data of transaction packet 302 may be formatted for expansion bus 145 and may, therefore, require re-formatting in preparation for being stored into one or more cache lines in a cache memory. If the payload is larger than the size of a single cache line, then re-formatting the payload data may include breaking the payload into multiple blocks that may each be the size of a single cache line or less. In some embodiments, bus controller 314 may perform the re-formatting. In other embodiments, this step may be skipped and a cache controller may format the data instead.

A determination may then be made if transaction packet 302 indicates a preferred cache bank or a preferred cache memory (block 405). In some embodiments, the header of transaction packet 302 may include values to indicate a preferred cache memory in which to store the payload. In further embodiments, the header may also include values to indicate a preferred cache bank within the preferred cache memory. For example, bus controller 314 may determine from the header of transaction packet 302 that the payload is directed to bank 0 of L2 cache 325. If a preferred cache bank or a preferred cache memory is specified, then the method may move to block 406. Otherwise, the method may determine an alternate destination location in block 409.

If a preferred cache bank or a preferred cache memory is specified, then a write request may be sent to the preferred cache (block 406). In some embodiments, a write request may be sent to verify the preferred cache can accept the payload data. For example L2 cache 325 may need to confirm that bank 0 has sufficient open cache lines to store the payload from transaction packet 302. The write request may be sent from bus controller 314 to peripheral interface unit 312, which may, in turn, format the write request for a system bus such as CPU bus 105 in FIG. 1. The request may go to coherency unit 321 which may know the status of L2 cache 325. In other embodiments, the request may go to L2 cache 325.

A determination may be made if the preferred cache is able to accept data for storage (block 407). For example, L2 cache 325 may not have enough open cache lines in bank 0 to store the payload from transaction packet 302. Alternatively, L2 cache 325 may not be able to accept data due to being busy with another cache operation. If the preferred cache is able to accept data, then the method may move to block 408. Otherwise, the method may transition to block 409 in which an alternate destination location may be determined.

If the preferred cache is able to accept data, then the data formatted in block 404 may be sent to the preferred cache (block 408). In some embodiments, a preferred cache bank may be specified. In other embodiments, just a preferred cache may be specified. The write to the preferred cache may be performed by a DMA controller, such as DMA controller 323. For example, bus controller 314 may send the formatted data to DMA controller 323, via processor interface unit 312, with instructions to store the formatted data in bank 0 of L2 cache 325. DMA controller 323 may perform a DMA write to L2 cache 325 via CPU bus 105. Depending on the size of the formatted data and the bit width of CPU bus 105, DMA controller 323 may require multiple writes to transfer all of the data from the original payload of transaction packet 302. When all of the data from the original payload has been transferred, the method may end in block 410.

If the preferred cache was unable to accept data or if a preferred cache was not indicated, then an alternate cache location may be identified for storing the formatted data (block 409). As described below in more detail, bus controller 314 may, in various embodiments, attempt to identify an alternate cache location, either in the same cache if the preferred cache did not have sufficient open cache lines or a different cache if the preferred cache lacks sufficient open lines in other banks, or if the preferred cache is busy servicing a different cache request. In other embodiments, bus controller 314 may convert the DMA cache write request to a DMA write request to memory 330. Once the payload data has been sent to an alternate memory location, the method may conclude in block 410.

It is noted that the method illustrated in FIG. 4 is merely an example. Although the operations illustrated in method in FIG. 4 are depicted as being performed in a sequential fashion, in other embodiments, some or all of the operations may be performed in parallel or in a different sequence. In some embodiments, additional operations may be included.

Figure 5:
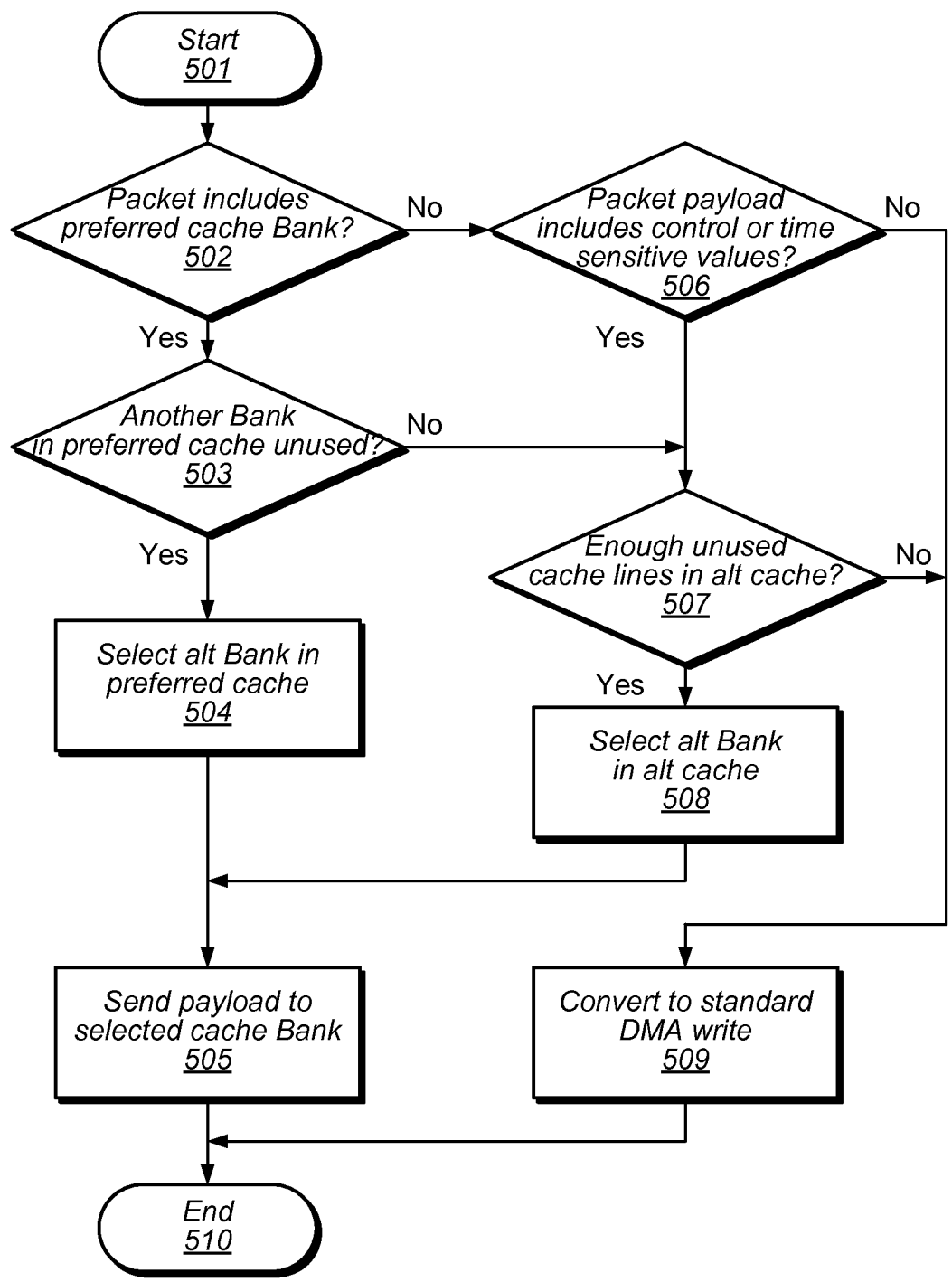
FIG. 5 illustrates a flow chart depicting an embodiment of a method for redirecting transaction packets.

Turning now to FIG. 5, a method is illustrated for selecting an alternate memory location and transmitting a payload from a transaction packet to the alternate memory location. The method of FIG. 5 may correspond to block 409 in FIG. 4. Referring collectively to the computing system and data flow illustrated in FIG. 3 and the flowchart in FIG. 5, the method may begin in block 501 with peripheral 301 sending transaction packet 302 to be stored in bank 0 of L2 cache 325.

The method may depend on the content of the header of transaction packet 302. A determination may be made if made if transaction packet 302 indicates a preferred cache bank (block 502). If a preferred cache bank is indicated, then the method may continue to block 503. Otherwise, the method may evaluate the payload of transaction packet 302 in block 506.

If a preferred cache bank was indicated, but the preferred bank cannot accept more data, then a determination may be made if an alternate bank in the same cache can accept the payload of transaction packet 302 (block 503). In some embodiments, transaction packet 302 may be targeted for a specific processor and the preferred cache may only assign certain banks to the specific processor.

For example, the preferred cache bank may be bank 0 of L2 cache 325. L2 cache may be subdivided into a number of banks, such as, for example, eight. L2 cache may be coupled to several processors, such as processor 320 and three additional processors. Bank 0 and bank 1 in L2 cache 325 may be assigned to processor 320 and the remaining banks may be assigned to the other three processors. In a different embodiment, L2 cache 325 may have the same number of banks and be coupled to the same number of processors but may assign the banks to the processors dynamically as data storage requests are received. In some embodiments, an alternate bank in the same cache may only be selected if that alternate bank is assigned to the same preferred processor. If L2 cache 325 can accept the payload of transaction packet 302 into bank 1, then the method may continue to block 504. Otherwise, the method may jump to block 507 in which an alternate cache location may be determined.

If bank 1 of L2 cache 325 can accept the payload of transaction packet 302, then bank 1 may be accepted (block 504). In some embodiments, L2 cache 325 may send a message to bus controller 314 stating bank 0 is unavailable but bank 1 is available. In other embodiments, coherency unit 321 may generate and send the message to bus controller 314.

Bus controller 314 may generate a DMA write request to send the payload of transaction packet 302 to bank 1 of L2 cache 325 (block 505). The bus controller may have already formatted the payload for a cache write or, in other embodiments, bus controller 314 may now format the payload for L2 cache 325. The DMA write request may be sent to DMA 323. The method may then end in block 510.

If transaction packet 302 did not indicate a preferred cache bank in block 502, then the method may depend on the type of data in the payload of transaction packet 302 (block 506). A determination may be made if the payload includes control values or time sensitive data. If time sensitive data or control values are included in the payload, then storing the data to a cache rather than memory 330 may be desirable such that the time sensitive data or control values may be processed faster than if stored in memory 330. In such cases, the method may move to block 507. If time sensitive data or control values are not included in the payload of transaction packet 302, then the method may transition to block 509 in which the DMA write may be converted to write to memory 330.

A determination may be made if any appropriate cache has enough unused cache lines for the payload of transaction packet 302 (block 507). If the method arrived here from block 506, an appropriate cache may be any cache with available storage space that is coupled to a processor with bandwidth to process the time sensitive data or control values included in the payload of transaction packet 302. If the method arrived in block 507 from block 503, then an appropriate cache may be any cache with available storage space that is coupled to the same processor as the indicated preferred cache.

Returning to the previous example, if bank 0 of L2 cache 325 is the indicated preferred cache but both bank 0 and bank 1 are unavailable, then another cache coupled to processor 320, such as, e.g., L3 cache 327, may be selected. L3 cache 327 may have bank 0 and bank 1 assigned to processor 320 and bank 0 may have enough unused cache lines for the payload of transaction packet 302. If L3 cache 327 has enough unused cache lines for the payload and is available to receive data, then the method may move to block 508. Otherwise, the method may move to block 509.

If bank 0 of L3 cache 327 can accept the payload of transaction packet 302, then bank 0 may be selected (block 508). In some embodiments, L3 cache 327 may send a message to bus controller 314 stating bank 0 is available. In other embodiments, coherency unit 321 may generate and send the message to bus controller 314. The method may continue to block 505 in which bus controller 314 prepares the payload and generates a DMA write request and sends the request to DMA controller 323.

If transaction packet 302 does not include time sensitive data or control values as determined in block 506 or if an alternate cache location cannot be identified in block 507, then bus controller 314 may convert the payload of transaction packet 302 to a standard DMA write (block 509). A standard DMA write may refer to a DMA transfer in which the destination location is a standard address on a system bus, such as, e.g., processor bus 210 in FIG. 2. Memory 330 may be the target of the standard DMA write. In some embodiments, a specific address may be determined for storing the payload data. In other embodiments, the payload data may be placed in the next entry of a last-in-first-out (LIFO) stack or a first-in-first-out (FIFO) buffer, either of which may be implemented at a given address in memory 330.

It is noted that the method illustrated in FIG. 5 is merely an example embodiment. Although the operations illustrated in method in FIG. 5 are depicted as being performed in a sequential fashion, in other embodiments, some or all of the operations may be performed in parallel or in a different sequence.

Some embodiments of a computing system may include a credit system for managing how much cache space a given peripheral may use at a given point in time. A credit system may involve allotting a number of credits to one or more peripherals in a computer system and subtracting credits as a given peripheral writes data to a cache and adding credits when the data is evicted (i.e. removed) from the cache. In various embodiments, an equal number credits may be allotted to each peripheral, or the number of credits may be determined based on the function of the peripheral. For example, an Ethernet network interface card may receive more credits than an audio processor if networking is determined to be a higher priority or require more I/O bandwidth. Credits may be allotted to peripherals for each cache or each cache bank in a computer system or in other embodiments, peripherals may be allotted a single number of credits to be used for all cache storage. For example, in a system with a cache divided into eight banks, a peripheral may be given one allotment of credits from which credits are deducted for any write to any cache bank or, in other embodiments, a peripheral may be given eight individual allotments, one to be used for each cache bank.

Figure 6:
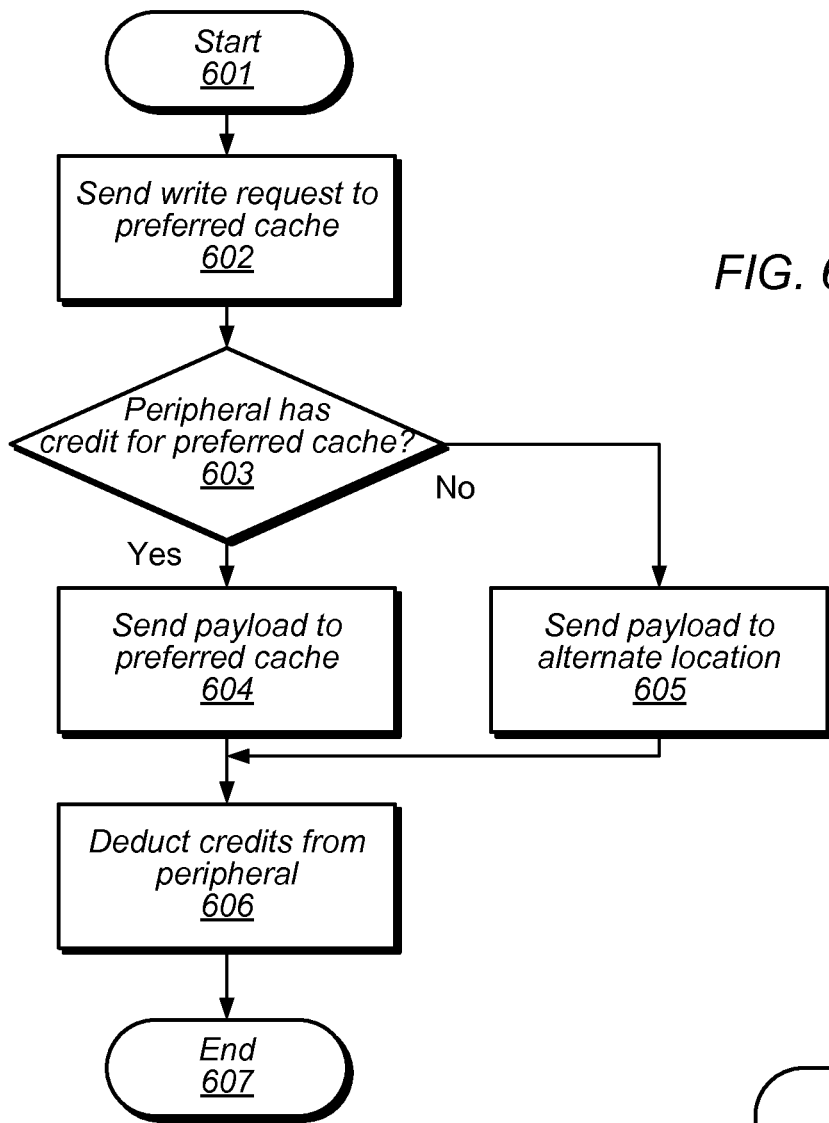
FIG. 6 illustrates a flow chart depicting an embodiment of a method for managing credits for a device.

Turning now to FIG. 6, a method is illustrated for managing a cache credit system for peripherals in an embodiment of a computer system. Referring collectively to the computing system and data flow illustrated in FIG. 3 and the flowchart in FIG. 6, the method may begin in block 601 with bus controller 314 having determined transaction packet 302 from peripheral 301 indicates L2 cache 325 is a preferred cache.

A write request may be sent to L2 cache 325 from bus controller 314 (block 602). The write request may include the size of the payload of transaction packet 302. L2 cache 325 may receive the request and, in response, L2 cache 325 may indicate if peripheral 301 has enough credits available for the size of the payload. In various embodiments, bus controller 314 or coherency unit 321 may manage the addition and subtraction of credits for peripheral 301.

The method may then depend on whether peripheral 301 has sufficient credits for the L2 cache 325 (block 603). In various embodiments, each credit may correspond to a number of bytes or a number of cache lines or a number of credits may be required for each byte or cache line. If peripheral 301 lacks sufficient credits, the method may move to block 605 in which an alternate location may be determined.

If peripheral 301 has enough credits, then bus controller 314 may send the payload of transaction packet 302 to L2 cache 325 (block 604). The write to L2 cache 325 may be executed through DMA controller 323 and may take several DMA transactions to transfer all data from the payload to L2 cache 325.

If peripheral 301 lacks sufficient credits for L2 cache 325, then the payload of transaction packet 302 may be sent to an alternate memory location (block 605). In some embodiments, the alternate memory may be memory 330. In other embodiments, another cache may be selected, such as L3 cache 327. If another cache is selected, a determination may be made if peripheral 301 has enough credits for the other cache.

Once the payload from transaction packet 302 has been stored in the selected memory, a corresponding number of credits may be deducted from the allotment of peripheral 301. If the selected memory was memory 330, no credits may be deducted since the write was not to a cache. If L3 cache 327 was selected, then the deduction may be made from a different allotment of credits, corresponding to memory usage in L3 cache 327 rather than an allotment corresponding to memory usage in L2 cache 325. In other embodiments, peripheral 301 may have a single allotment of credits corresponding to memory usage in all cache memories. The method may complete in block 607.

The method of FIG. 6 is merely an example. Although the operations illustrated in method in FIG. 6 are depicted as being performed in a sequential fashion, in other embodiments, some or all of the operations may be performed in parallel or in a different sequence.

Figure 7:
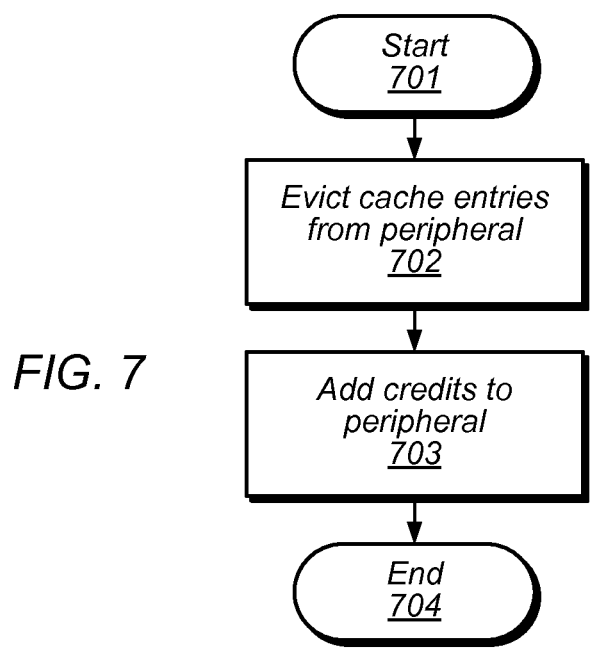
FIG. 7 illustrates a flow chart depicting another embodiment of a method for managing credits for a device.

Moving to FIG. 7, a method is illustrated for managing a cache credit system for peripherals when data is evicted from a cache. Referring collectively to the computing system and data flow illustrated in FIG. 3 and the flowchart in FIG. 7, the method may begin in block 701 with a cache memory such as, for example, L2 cache 325 as illustrated in FIG. 3, having an entry from a peripheral such as peripheral 301.

L2 cache 325 may evict data originating from peripheral 301 (block 702). The data may be evicted for any of a number of reasons, such as for example, to make room for newer data. The data may be in a single cache line or span several cache lines resulting in multiple evictions, one for each cache line. Data that is evicted may be written back to main memory.

A number of credits may be added to the allotment of peripheral 301 (block 703). The number of credits may correspond to the number of cache lines evicted or may correspond to a number of bytes that were contained in the evicted cache lines. In some embodiments, peripheral 301 may have a single allotment of credits and in other allotments the additional credits may be added to an allotment corresponding to memory usage in L2 cache 325. The method may end in block 704.

The method illustrated in FIG. 7 is merely an example. It is noted that the operations illustrated in the method of FIG. 7 are depicted as being performed in a sequential fashion. However, in other embodiments, some or all of the operations may be performed in parallel or in a different sequence.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a bridge unit configured to:
      receive a transaction packet on a communications bus, wherein the transaction packet includes a header and a data payload; and
      determine if the header of the received transaction packet identifies a preferred destination in a cache memory of a processor, responsive to a determination the header indicates a Direct Memory Access (DMA) write instruction to the cache memory; and
   a processor interface unit coupled to the bridge unit, wherein the processor interface is configured to:
      format the data payload of the received transaction packet for storage in the cache memory responsive to the determination the header indicates the DMA write instruction to the cache memory;
      select the preferred destination in the cache memory as a target destination for the DMA write instruction responsive to receiving a notification from the processor that the preferred destination in the cache memory can accept more data; and
      send the formatted data payload to the processor with instructions to store the formatted data payload in the target destination.

2. The apparatus of claim 1, wherein the processor interface unit is further configured to select an alternate destination in the cache memory as the target destination responsive to a determination the header does not identify the preferred destination in the cache memory.

3. The apparatus of claim 2, wherein to determine the target destination of the cache memory, the processor interface unit is further configured to determine if the data payload of the transaction packet includes control data or time-sensitive data.

4. The apparatus of claim 2, wherein the processor interface unit is further configured to select a memory location outside of the cache memory as the target destination responsive to a determination that the data payload of the transaction packet includes infrequently accessed data.

5. The apparatus of claim 1, wherein the processor interface unit is further configured to select an alternate destination in the cache memory as the target destination responsive to receiving a notification from the processor that the preferred destination in the cache cannot accept more data.

6. The apparatus of claim 1, wherein the cache memory includes a plurality of cache levels, and wherein the preferred destination includes a preferred level of the plurality of levels.

7. The apparatus of claim 1, wherein the cache memory includes a plurality of banks, and wherein the preferred destination includes a preferred bank of the plurality of banks.

8. A method for managing a bus interface, comprising:
receiving a transaction packet from a device via a communication bus, wherein the transaction packet includes a header and a payload;
determining if the header of the received transaction packet identifies a preferred destination in a cache memory, responsive to a determination that the received transaction packet includes a Direct Memory Access (DMA) write instruction;
re-formatting the payload of the received transaction packet into one or more cache line sized blocks responsive to the determination that the received transaction packet includes the DMA write instruction;
selecting the preferred destination in the cache memory as a target destination for the DMA write instruction responsive to receiving a notification that the preferred destination in the cache memory can accept more data; and
sending the re-formatted payload of the transaction packet to a processor with an instruction to store the re-formatted payload in the target destination.

9. The method of claim 8, further comprising selecting an alternate destination in the cache memory as the target destination responsive to determining the header of the received transaction packet does not identify the preferred destination in the cache memory.

10. The method of claim 8, further comprising selecting an alternate destination in the cache memory as the target destination responsive to receiving a notification that the preferred destination in the cache memory cannot store more data.

11. The method of claim 8, wherein the cache memory includes a plurality of banks, and wherein the preferred destination includes a preferred bank of the plurality of banks.

12. The method of claim 8, further comprising limiting a number of entries in the cache memory to which the device may send data, wherein limiting a number of entries in the cache memory includes adding credits to a credit total for the device responsive to entries from the device in the cache memory being released and subtracting credits from the credit total for the device responsive to the device storing data in the cache memory.

13. The method of claim 8, further comprising selecting a memory location outside of the cache memory as the target destination responsive to a determination that execution of the DMA write instruction will be delayed.

14. A system, comprising:
a first memory configured to store program instructions and data;
a cache memory coupled to the first memory;
a processor coupled to the cache memory, wherein the processor is configured to request program instructions and data from the cache memory;
a Direct Memory Access (DMA) controller coupled to the first memory and to the cache memory;
at least one peripheral device configured to identify a preferred destination in the cache memory in which to store data; and
a bus interface coupled to the DMA controller and the at least one peripheral device, wherein the bus interface is configured to:
receive a transaction packet from the at least one peripheral device;
select the preferred destination in the cache memory as a target destination for a DMA write instruction responsive to a determination that the transaction packet includes the DMA write instruction; and
send contents of the transaction packet to the DMA controller along with instructions to store the contents in the target destination.

15. The system of claim 14, wherein the cache memory includes a plurality of banks, and wherein the preferred destination includes a preferred bank of the plurality of banks.

16. The system of claim 14, wherein the cache memory includes a plurality of cache levels, and wherein the preferred destination includes a preferred cache level of the plurality cache levels.

17. The system of claim 14, wherein the bus interface is further configured to:
limit an amount of data the at least one peripheral device may store in the target destination in the cache memory;
add credits to a number of credits for the at least one peripheral device as data is released from the target destination in the cache memory by cache control logic; and
deducting credits from the number of credits for the at least one peripheral device as data is stored in the target destination in the cache memory by the at least one peripheral device.

18. The system of claim 17, wherein responsive to a determination that the at least one peripheral device has insufficient credits to store data in the target destination in the cache memory, the bus interface is further configured to select an alternate destination in the cache memory as the target destination dependent on the transaction packet including control values.

19. The system of claim 17, wherein responsive to a determination that the at least one peripheral device has insufficient credits to store data in the target destination in the cache memory, the bus interface is further configured to select an alternate destination in the cache memory as the target destination dependent on the transaction packet including time sensitive data.

20. The system of claim 17, wherein responsive to a determination that the at least one peripheral device has insufficient credits to store data in the target destination in the cache memory, the bus interface is further configured to select an address in the first memory as the target destination dependent on the transaction packet including infrequently accessed data.

* * * * *